2,711,998

AQUEOUS HALOALKYL PHOSPHATE-AMINO RESIN FLAMEPROOFING COMPOSITIONS

Jeremiah W. Weaver, New Orleans, John G. Frick, Jr., Metairie, and John David Reid, New Orleans, La., assignors to the United States of America as represented by the Secretary of Agriculture No Drawing. Application October 31, 1952, Serial No. 318,142

9 Claims. (Cl. 260—29.4)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the flameproofing of textiles. More particularly the invention provides flameproofing compositions: which can be applied in the form of aqueous solutions using conventional textile impregnation equipment and procedures; which can flameproof cotton textiles in single application; and which can continue to flameproof cotton textiles to which they are applied after several launderings.

The flameproofing agents provided by this invention in general comprise an aqueous solution containing (1) an ammonium salt of a polyhalopropanol acid ester of ortho phosphoric acid selected from the group consisting of the chloro and bromo esters, (2) a water soluble reaction product of formaldehyde with a nitrogen compound capable of reacting with formaldehyde to form an amino resin, particularly melamine, guanidine, and urea, and (3) enough ammonium hydroxide to render the solution basic.

The ammonium salts can suitably be a neutral salt of ortho phosphoric acid mono or diesters of dibromopropanol, or dichloropropanol, or mixtures of such acid esters. The ammonium salt of bis(2,3-dibromopropyl) phosphate is preferred.

The reaction product of formaldehyde with the nitrogen compound can suitably be the product immediately produced when formaldehyde and the nitrogen compound are contacted at about room temperature, or, in the case of nitrogen compounds such as guanidine, melamine or their homologs, can suitably be the product produced by a reaction which attaches sufficient methylol groups to produce a water soluble product, or mixtures of such products. The ratio of formaldehyde to the nitrogen compound can suitably be any ratio capable of ultimately producing a solid water insoluble amino resin. Melamine is a preferred nitrogen compound.

The ratio of the ammonium salt to the reaction product of formaldehyde with the nitrogen compound can suitably be varied widely, from about 0.15 to 1.0 part of ammonium salt per part of formaldehyde-nitrogen compound reaction product being suitable. About 0.3 to 1 part of ammonium salt per part of formaldehyde-nitrogen compound reaction product is preferred.

The amount of water in the flameproofing compositions can suitably be varied from enough to provide a workably fluid solution to enough to provide any desired dilution. The flameproofing compositions can be applied to textiles by a single treatment or a plurality of treatments. The amount of water in the compositions is preferably adjusted, prior to impregnating the textile, to an amount sufficient to cause the particular textile being treated to pick up on a dry basis from 10 to 25 percent of the non-aqueous components of the compositions in a single impregnation with the textile impregnating apparatus and procedure being used.

The non-aqueous components of the compositions can suitably be applied to the textiles to be flameproofed in any order, but are preferably combined into a single aqueous solution and applied as components of that solution.

Materials such as softening agents, dyes, wetting agents and the like which are non-reactive to the components of the flameproofing compositions can suitably be incorporated in the compositions.

In general according to the present invention textiles are flameproofed by impregnating them with an aqueous solution of the flameproofing compositions provided by this invention until the pick-up on a dry basis is from about 10 to 25 percent, and drying and curing the so treated textile.

Cotton fabrics are preferably impregnated to a dry pick-up of from about 10 to 25% in a single impregnation step.

Textiles impregnated with the flameproofing compositions of this invention can suitably be dried and cured using the conventional textile drying and curing procedures and apparatus. Drying at from about 60 to 65° C. and curing for about 3 to 8 minutes at about 140 to 150° C. is preferred.

The following examples are illustrative of the invention:

*Example I*

Bis(2,3-dibromopropyl) phosphate and 1 part of a water soluble product of reacting melamine with 3 moles of formaldehyde and sufficient ammonium hydroxide to provide a pH>7 were dissolved in 4 parts of water.

A 8.2 oz. cotton twill fabric was impregnated with the above composition in a single step using conventional laboratory textile impregnation procedures and apparatus. The dry pick-up was 24 percent. The so treated fabric was dried at from 60 to 65° C. and the dry fabric was cured for 5 minutes at 150° C. The so treated fabric was flameproof.

*Example II*

Example I was repeated using a water soluble reaction product of urea with 2 moles of formaldehyde in place of the melamine reaction product.

A similar fabric impregnated and cured in a similar manner was flameproof.

*Example III*

Example I was repeated using the diester of phosphoric acid and a commercial mixture of dichloropropanols in place of bis(2,3-dibromopropyl) phosphate.

A similar fabric impregnated and cured in a similar manner was flameproof.

*Example IV*

A solution consisting of 34.2 g. of a 50% solution of the ammonium salt of mono(dibromopropyl) phosphate, 12.9 g. of methylol melamine and 52.9 ml. of water (30% solids concentration) (ratio of 3:4) was padded on a piece of 8.2 oz. cotton cloth, dried at 60° for 10 minutes and cured at 150° C. for 8 minutes. The treated cloth was washed with a detergent in hot water, rinsed several times and soured with sodium acid fluoride.

The treated sample was flameproof, having a char-length of 4". (Fed. Spec. CCC–T–191B Meth. 5902, Flame Resistance of Cloth: Vertical Test, dated May 15, 1951.) Net resin pick-up after washing was 9.2%.

*Example V*

Example III was repeated using the mono(dibromopropyyl) phosphate salt to methylol melamine ratios indicated. Cloths treated with the compositions were flameproof and after washing exhibited the indicated char lengths and dry pick-ups.

| Ratio | Char Length, Inches | Pick-up, Percent |
|---|---|---|
| 1:2 | 4.4 | 11.8 |
| 1:3 | 4.2 | 13.6 |
| 1:4 | 4.6 | 13.1 |
| 1:5 | 4.0 | 14.7 |
| 1:6 | 4.5 | 14.6 |
| 1:7 | 4.0 | 14.7 |

*Example VI*

A piece of 8.2 oz. cotton cloth was padded with a solution of 34.2 g. of a 50% solution of the ammonium salt bis(dibromopropyl) phosphate, 12.9 g. methylol-melamine and 52.9 ml. water (30% solutions—4:3 ratio). After drying and curing as in Example IV, the cured pick-up was 20.2%, washed pickup was 7.6%, the sample was not flameproof.

However, when the same procedure was used with a ratio of 3:4 (acid ester salt to methylol-melamine) cured pick-up was 19.2% and washed pick-up was 10.3%. The sample had a char length of 4.6".

We claim:

1. A textile flameproofing composition comprising an aqueous solution containing (1) an ammonium salt of a polyhalopropanol acid ester of phosphoric acid selected from the group consisting of the chloro and bromo esters, (2) a water soluble reaction product of formaldehyde with a nitrogen compound selected from the group consisting of melamine, guanidine, and urea, and (3) enough ammonium hydroxide to render the solution basic, said ammonium salt and said formaldehyde-nitrogen compound reaction product being present in the solution in the proportion of from about 0.15 to 1.0 part of the ammonium salt per part of the formaldehyde-nitrogen compound reaction product.

2. A process of flameproofing a cotton fabric comprising impregnating the cotton fabric with the composition of claim 1 until the dry pick-up of the fabric is about from 10 to 25 percent, and drying and curing the so-treated fabric.

3. The flameproofed cotton fabric resulting from the process of claim 2.

4. A textile flamproofing composition comprising an aqueous solution containing (1) an ammonium salt of a 2,3-dibromopropanol acid ester of phosphoric acid, (2) a water soluble reaction product of formaldehyde with a nitrogen compound selected from the group consisting of melamine, guanidine, and urea, and (3) enough ammonium hydroxide to render the solution basic, said ammonium salt and said formaldehyde-nitrogen compound reaction product being present in the solution in the proportion of from about 0.15 to 1.0 part of the ammonium salt per part of the formaldehyde-nitrogen compound reaction product.

5. A process of flameproofing a cotton fabric comprising impregnating the cotton fabric with the composition of claim 4 until the dry pick-up of the fabric is about from 10 to 25 percent, and drying and curing the so-treated fabric.

6. The flameproofed cotton fabric resulting from the process of claim 5.

7. A textile flameproofing composition comprising an aqueous solution containing (1) the ammonium salt of bis(2,3-dibromopropyl) phosphate, (2) methylol melamine, and (3) enough ammonium hydroxide to render the solution basic, said ammonium salt and said methylol melamine being present in the solution in the proportion of from about 0.15 to 1.0 part of the ammonium salt per part of the methylol melamine.

8. A process of flameproofing a cotton fabric comprising impregnating the cotton fabric with the composition of claim 7 until the dry pick-up of the fabric is about from 10 to 25 percent, and drying and curing the so-treated fabric.

9. The flameproofed cotton fabric resulting from the process of claim 8.

References Cited in the file of this patent

UNITED STATES PATENTS

| 2,452,054 | Jones et al. | Oct. 26, 1948 |
| 2,610,978 | Lanham | Sept. 16, 1952 |